Feb. 19, 1963  J. C. STILES  3,077,785
PIVOT SPRING SUSPENDED GYRO
Filed Sept. 9, 1959  4 Sheets-Sheet 2

INVENTOR.
JOHN C. STILES
BY
Sidney G. Faber
ATTORNEYS

INVENTOR.
JOHN C. STILES
ATTORNEYS

Feb. 19, 1963  J. C. STILES  3,077,785
PIVOT SPRING SUSPENDED GYRO
Filed Sept. 9, 1959  4 Sheets-Sheet 4
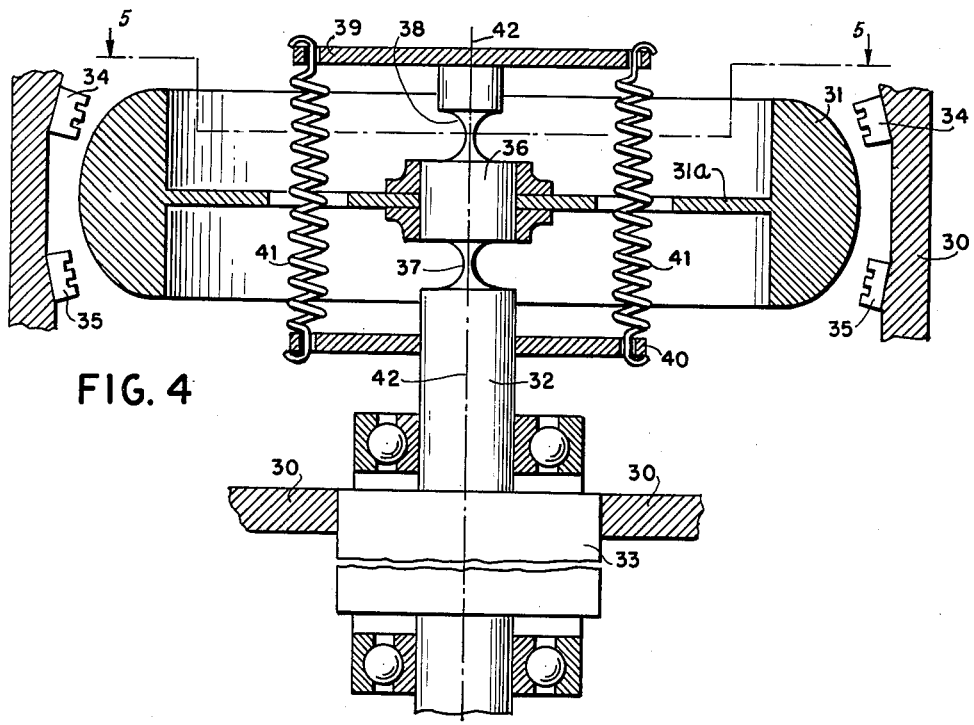
FIG. 4
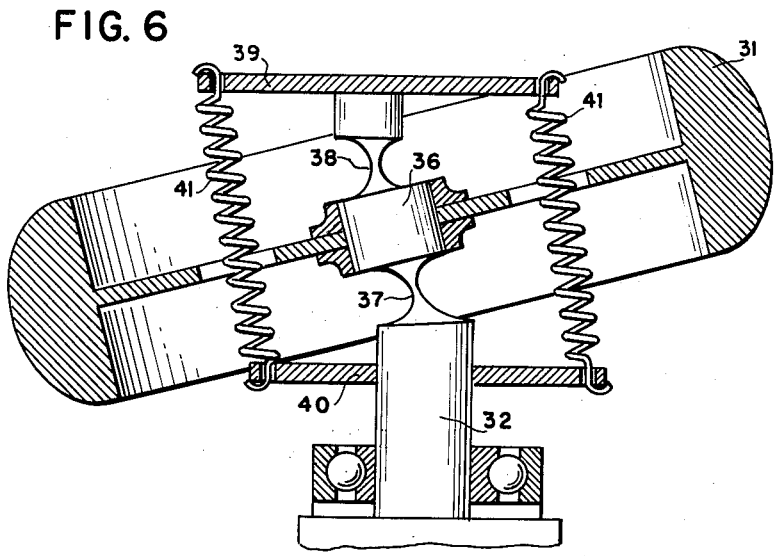
FIG. 6
INVENTOR.
JOHN C. STILES
Sidney G. Faber
ATTORNEYS United States Patent Office 3,077,785
Patented Feb. 19, 1963

3,077,785
PIVOT SPRING SUSPENDED GYRO
John C. Stiles, Morristown, N.J., assignor to General
Precision, Inc., a corporation of Delaware
Filed Sept. 9, 1959, Ser. No. 838,979
3 Claims. (Cl. 74—5)

This invention generally relates to improvements in gyroscopes having two-degrees-of-freedom and is particularly concerned with improved gyros for use on high-speed craft, such as aircraft, missiles and the like.

As the heart of many navigation and control systems, the gyroscope must be a device of great precision, accuracy and reliability, and considerable effort is being constantly directed to render such devices as free from error as possible. Ideally, the gyroscope should comprise an element that will maintain a fixed orientation in space over long periods of time despite wear, changes in temperature and other environmental factors and thereby provide an extremely accurate reference to enable detection and control of changes in the attitude of the craft. The most common means of obtaining such a reference element is by rapidly spinning a rotor about a spin axis and by pivotally supporting the spinning rotor with respect to the craft, on a plurality of axes, by such means as pivots, bearings, magnets, or the like, whereby the craft may change direction and attitude without disturbing the orientation of the rotor. However, known mechanical pivots and bearings are subject both to friction, wear and play, thereby introducing error torques tending to tilt the spin axis of the rotor, as well as producing changes in its mass distribution with wear that in turn causes the spin axis to deviate or "drift" from its initial position. The presence of dirt or even minute solid particles, also introduces errors both in the mechanical gyro suspensions, as well as in the other types, since the solid particles increase friction, contaminate the fluid, and otherwise interfere with proper operation by introducing mass unbalances, hysteresis effects, and other spurious torques. Variations in the surrounding temperature also produce errors, by unequally expanding the gyro elements to shift the mass distribution of its parts.

For all of these reasons, gyroscopes are manufactured and adjusted under only the most highly controlled atmosphere, temperature, cleanliness conditions and to extremely close tolerances. Moreover, despite this great care, many of these spurious errors can only be minimized to a greater or lesser extent depending upon the type of gyro construction but cannot be completely eliminated by any known means.

According to the present invention there is provided a novel and unique type of gyro construction and suspension that is inherently not subject to many of these errors. Although this gyro may generally be characterized as being of the mechanical variety, a preferred form thereof does not employ either bearings or jewels for pivotal suspension purposes but rather an improved variety of astatic spring or flexure suspension. Furthermore the bearings that are employed for purposes of spinning the flywheel are not required to be either small, delicate or unusually precise but rather may be larger and considerably more rugged and durable than those customarily employed in precision gyros. The mode of interaction of the parts also differs from known construction in that the pivotable means for enabling relative tilting of the gyro and housing with two-degrees-of-freedom is functionally isolated from the spin bearings, whereby the flywheel alone provides the stable element in space and all other parts including the spin bearings are rigidly fastened to the frame or housing.

To minimize the adverse effects of temperature variation, the novel construction of the gyro of the present invention permits the use of a heat insulating vacuum housing to tightly enclose the operating components, and the unique gyro construction provides a minimum number of heat conducting paths within the housing, thereby to maintain substantially constant temperature conditions as in a vacuum container, and eliminating the need for auxiliary heating coils, which are employed in many gyro constructions.

It is accordingly one object of the present invention to provide a two axis gyroscope having improved drift characteristics.

A further object is to provide such a gyro having a longer stable life and being less subject to unbalanced error torques caused by friction, dirt, and variation in the surrounding temperature.

Still another object is to reduce the cost and the complexity of the equipment required for making precision gyroscopes.

Other objects and many additional advantages will be more readily comprehended by those skilled in the art after a detailed consideration of the following specification taken with the accompanying drawings wherein:

FIGURE 4 is a vertical sectional view similar to FIGURE 1 showing an alternative embodiment of the invention.

FIGURE 6 is a vertical sectional view of portions of FIGURE 5 for illustrating its operation, showing the flywheel angularly displaced relative to the axis of the shaft.

FIGURE 7 is an enlarged section through one of the torquers shown in FIGURES 1, 2 and 3, showing a coil surrounding each leg of the torquer.

FIGURE 8 is a top plan view of one of the torquers shown in FIGURES 1, 3 and 7, showing the coil surrounding one leg of the torquer.

Figure 1:
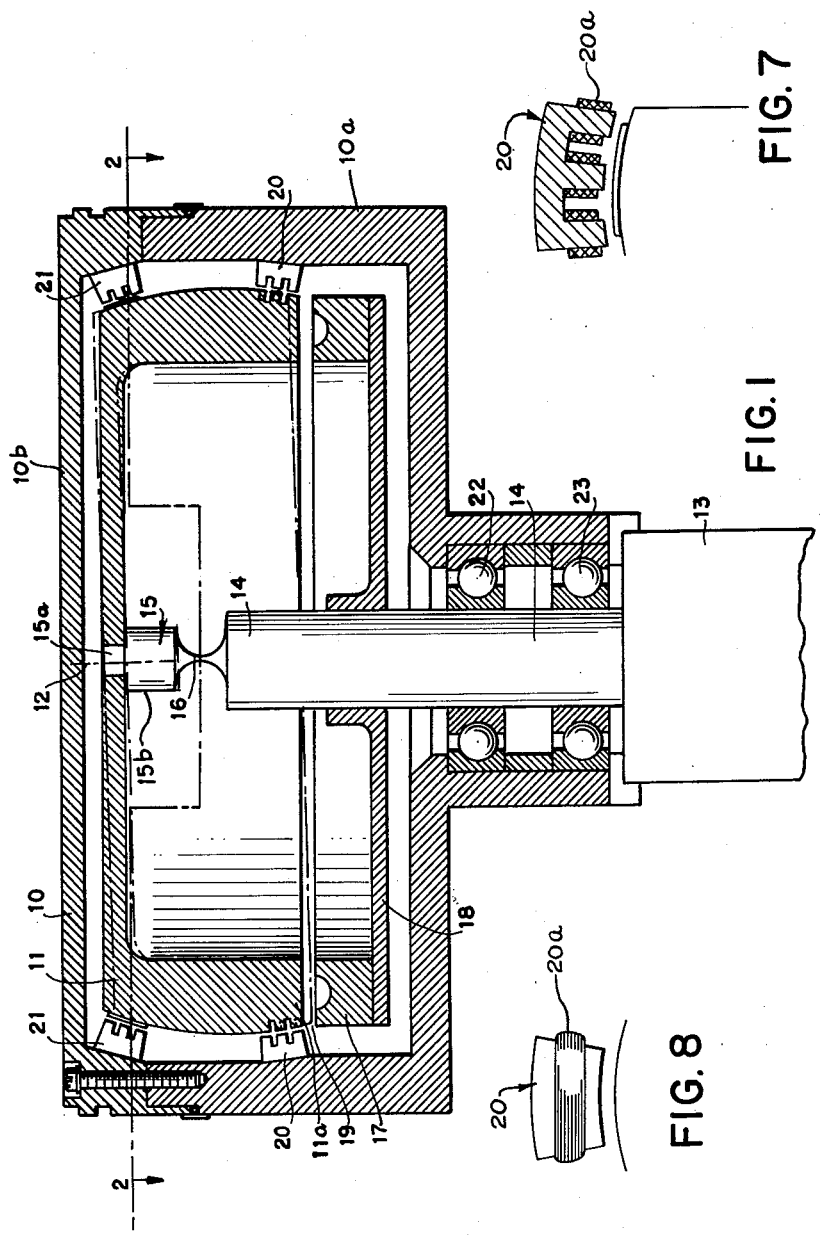
FIGURE 1 is a vertical sectional view in side elevation of one preferred gyroscope according to the present invention.
Figure 2:
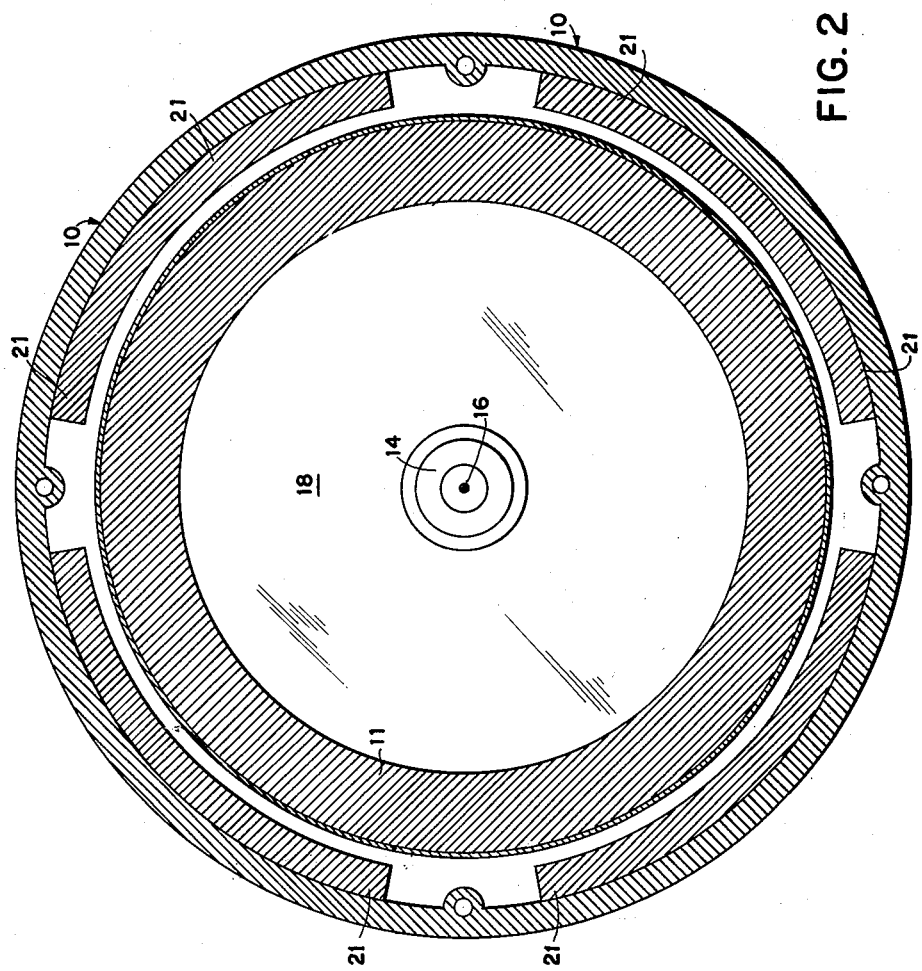
FIGURE 2 is a cross-sectional view through line 2—2 of FIGURE 1.

Referring now to the drawings for a detailed consideration of one preferred embodiment of the invention, there is shown in FIGURES 1 and 2 an outer housing 10 containing an inverted cup shaped flywheel or gyro rotor 11 of symmetrical configuration and being normally supported for high speed rotation about a substantially vertical spin axis 12 centrally passing therethrough. The housing 10 may be formed in two sections, a hollow cylindrical lower section 10a, surrounding the flywheel and other parts of the apparatus, and a mating upper section or cover 10b, which is attached to the lower section by a plurality of screws, or other suitable attaching means.

For spinning the gyro rotor at the high speed desired, there is provided outside of the housing 10 a substantially vertically positioned drive motor 13, which may be an electrical motor or other as desired. The drive motor 13 has an elongated upright drive shaft 14 projecting upwardly into the sealed housing 10, as shown, and is directly connected to the flywheel 11 at its rotative center by means of a flexure rod 15. Flexure rod 15 may be formed of a unitary solid cylinder of resilient spring metal having a symmetrically machined or otherwise necked portion 16 intermediate the flywheel 11 and the motor shaft 14.

The upper end 15a of the flexure rod 15 may be pressed into or otherwise fixedly fastened to the flywheel and the lower end thereof 15b integral with, or fixedly fastened to the motor shaft 14. Alternatively the flexure rod 15 may be a unitary extension of the motor shaft 14 thereby being made integrally with the shaft of the motor.

The function of the flexure rod member 15 is to provide a positive rotative drive connection between the motor shaft 14 and the flywheel 11 but to permit flexing or pivoting action therebetween about both coordinate axes perpendicular to the spin axis 12. Consequently, when the rather large and heavy flywheel 11 is being rotated at high speed by the motor, it serves as an effective gyroscope tending to maintain its same orientation in space despite tilting or pivoting of the housing 10 about either axis perpendicular to the normally vertical axis 12. Any such tilting or pivoting of the housing 10, as indicated by the dot-dash lines in FIGURE 1, merely serves to flex the flexure rod 15 about its necked portion 16 thereby providing a universally pivotable joint between the gyroscopic flywheel 11 and the housing 10. The limits of such flexure are, of course, determined by the clearances existing between the outer surface of the flywheel and the adjoining portions of the housing and other members attached thereto.

However, since the necked portion 16 of the flexure rod 15 operates as a spring and provides a torque in such direction as to oppose any displacement between the flywheel and the housing, there is provided a means for compensating or balancing of this spring torque to enable this structure to function as a position gyro. Such compensating means are preferably in the form of a permanent magnet member 17 supported on a circular disk or series of arms 18 which are positioned underneath the flywheel 11 and connected to the motor shaft 14 to rotate with the flywheel 11.

Since the magnet member or members 17 are equally spaced by a gap 19 about the rim portion 11a of the flywheel 11, they normally exert no resulting magnetic force tending to tilt or pivot the flywheel 11 when the flywheel and housing are in the aligned position of FIGURE 1, since the downward magnetic pull exerted on one location of the rim 11a is balanced by an opposing pull exerted against a diametrically opposite location on the rim 11a. However, whenever the gyro flywheel and housing are relatively displaced about the nominally vertical axis 12, the gap spacing between the magnet 17 and flywheel rim 11a at one location is reduced and that existing at a diametrically opposite location is increased, thereby increasing the magnetic force at said first location and decreasing the magnetic force at the diametrically opposite location. In other words, whenever the housing 10 is tilted about the flywheel spin axis 12, as indicated in dot-dash lines, FIGURE 1 the magnet 17 exerts a resulting force upon the flywheel tending to increase the displacement. Consequently, since the spring force provided by the necked portion 16 of flexure rod 15 opposes the tilting displacement and the force exerted by the magnet 17 aids the displacement, it is evident that these members may be initially designed and later adjusted until the forces provided thereby cancel one another and the flywheel housing combination may serve as a position gyro, as desired.

In this embodiment, the annular gap 19 between the confronting portions of the balancing magnet 17 and flywheel 11 may be mechanically adjusted by positioning these members until the pull exerted by the magnet 17 balances the spring force provided by the necked flexure 15, whereupon the flywheel is in effect decoupled from external torques and provides an angularly limited compliance astatic suspension. It is important to note that only the variation of magnetic pull with gap spacing need be balanced against the variation in spring force with displacement and that such matching need be adjusted only to about 1% for accurate gyro applications. The null position of the gyro rotor or flywheel 11 need not necessarily be oriented in true vertical, and the necked portion 16 of flexure rod 15 may even be permanently bent without adversely affecting the gyro performance. This results from the fact that any resulting error torques caused by such unbalances or bending, are distributed uniformly with rotation of the shaft and flexure rod and consequently any drift being produced cancels out or is uniformly distributed about the shaft.

To precess the gyro flywheel 11 for purposes of earth rate compensation and other navigational functions, there is provided a plurality of torquer 20 that are supported about the inside wall of the housing cover 10b and disposed circumferentially about the upper peripheral surface portion of the flywheel 11, as best shown in FIGURE 2. These torquer may be of the well known electromagnetic variety or may be electrostatically operating devices if desired, any one of which may be suitably energized to exert a resulting precessional force upon the gyro flywheel 11. As shown in FIGURES 7 and 8, each torquer has a coil or winding 20a wound around each leg thereof.

To generate electrical signals proportional to tilting or pivoting of the gyro housing about either of its sensitive axes, two pair of electrical pickoff means 21 may be supported on the inside wall of the housing 10 and below the torquers 20, as best shown in FIGURE 1. These pickoff means may be of the E-bridge variety customarily used in gyroscope constructions because of their sensitivity and accuracy, or may be of any other variety known to those skilled in the art.

It is to be particularly noted that this preferred construction provides many improvements over conventional gyro structures. Initially, it is noted that the pivot connection between the flywheel 11 and the shaft 14 is not required to carry the spin bearings 22 and 23 as in the conventional gimbal structures of most known gyro devices. Rather the bearings 22 and 23 are positioned before the pivot 16 of flexure rod 15 on the motor shaft 14, and carried by the housing 10, and consequently need not be delicate, small, or lightweight. Since one of the most frequent causes of gyro drift results from uneven spin axis bearing wear resulting in mass unbalance, the elimination of delicate and extremely precise bearings, or jewels considerably improves the gyro drift characteristics, as well as materially reducing the cost and complexity of the bearings. Furthermore, since the bearings 22 and 23 may be made larger and well lubricated, their useful life is considerably extended.

Although the spring restraint provided by the necked portion 16 of flexure means 15 provides a substantially linearly increasing force with displacement, whereas the force provided by the magnet 17, for example, varies nonlinearly with changes in the airgap 19, it is understood that the precision gyro of the present invention is intended to experience but very small angular displacements between the housing and flywheel or small changes in the air gap 19. Consequently over this rather limited range of displacement both the spring restraint and opposing magnetic pull may be considered linearly variable to cancel one another.

As is believed evident to those skilled in the art, the construction of FIGURE 1 substantially eliminates any hysteresis effects in the flexure spring 16 of the flexure rod 15 since the flexure rod 15 is continuously rotating at high speed and continuously flexes about the axis of necked portion 16 whenever any relative tilting between the flywheel and housing occurs. In this respect, the operation of the flywheel may be generally likened to the action of a spinning toy top at the tip of an upright shaft wherein despite tilting of the shaft from its vertical position, the toy top maintains its orientation in space.

To eliminate windage effects on the spinning flywheel 11, the air in the housing 10 is preferably evacuated through suitable outlet means which may thereafter be sealed to maintain the interior of the housing at a low order vacuum. If desired, a chemically inert gas of a viscosity lower than air may be substituted for the evacuated air.

By evacuating the air within the housing 10, the unique construction of the gyro also provides substantially constant temperature conditions within the housing since the evacuated housing in effect serves as a vacuum bottle enclosing the gyro in view of the relatively few heat conducting paths between the gyro structure and the housing. As shown in FIGURE 1, only the bearings 22 and 23 interconnect the motor shaft 14 to the housing, and the flywheel and magnet are supported by the motor shaft 14 out of contact with the housing. To minimize heat conduction therebetween, a suitable insulating material (not shown) may be interposed between the bearings and the housing and between the motor and the housing. Furthermore, the flywheel 11 is substantially fully immersed in a vacuum and connected to the motor shaft only through the thin necked portion 16 of the flexure rod 15, thereby substantially insulating the flywheel from the motor shaft and housing. These features are to be contrasted with conventional gyro constructions which do not obtain full accuracy until the proper thermal gradient and preselected operating temperatures are reached. The gyro of the present invention, on the other hand, operates effectively over a wide range of outside ambient temperatures with little, if any, warm-up time being required due to the substantial absence of heat reducing elements associated with the flywheel, the absence of pivot bearings, jewels, or supporting fluids or gases, and the vacuum bottle effect.

Figure 3:
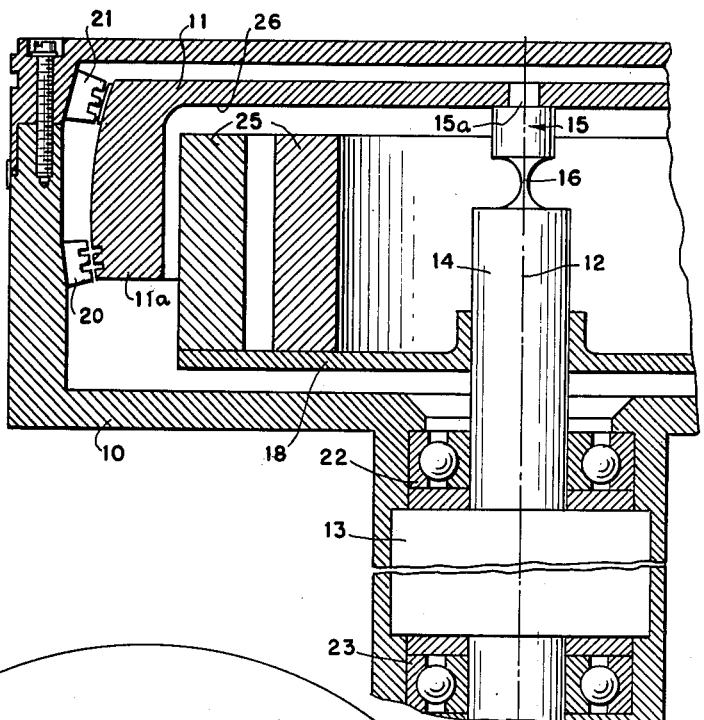
FIGURE 3 is a vertical sectional view similar to FIGURE 1 showing a modification thereof.

In FIGURE 3 is shown an alternative embodiment, similar to FIGURES 1 and 2, but wherein the balancing magnets 25 are disposed inside the inverted cup shaped gyro rotor 11 to operate upon its inside surface wall 26 rather than upon its lower rim portions 11a as in FIGURE 1. This change enables the diameter of the flywheel 11 to be made larger, increasing its moment of inertia, while at the same time enabling the height or depth of the housing 10 to be shortened, thereby providing a more compact arrangement. As shown, the balancing magnet member may also be comprised of two concentric annularly arranged magnets 25, rather than the single magnet construction of FIGURE 1. In all other respects, the parts and mode of operation are the same as described above in FIGURE 1 and bear the same reference numerals.

Figure 5:
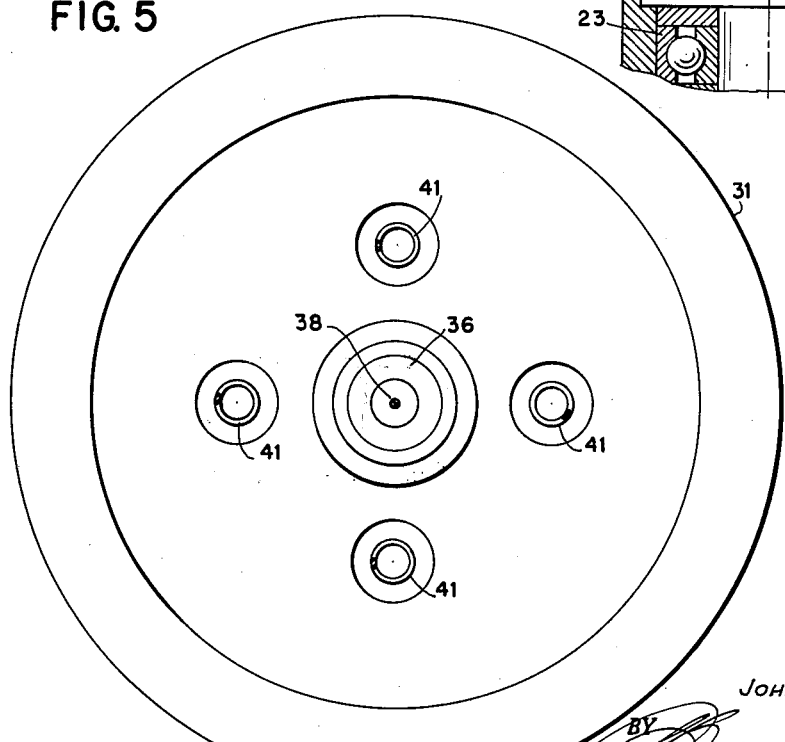
FIGURE 5 is a partial plan view and partial cross-sectional view through lines 5—5 of FIGURE 4.

In FIGURES 4 to 6, there is shown an alternative position gyro structure that eliminates the balancing magnet 17 of FIGURE 1 on the magnets 25 of FIGURE 3 and substitutes instead a mechanical spring balancing means to counteract the restoring force provided by the necked portion of the flexure rod. Referring to FIGURE 4, there is shown the outer case or housing 30 containing the gyro flywheel member 31 adapted to be rapidly rotated by means of a vertically disposed drive shaft 32 projecting into the housing 30, and driven by a motor 33 located outside thereof.

As in the embodiments of FIGURES 1 and 3, the rapidly spinning flywheel 31 defines a stable axis in space and any deviation between its spin axis and the central axis of the housing 30 is detected by means of pickoff devices 34 supported by the housing, about the upper periphery of the flywheel 31. Similarly any desired torquing of the flywheel 31 to displace its spin axis is provided by the torques 35 peripherally disposed about the flywheel 31 below the pickoff devices 34 as in the embodiments discussed above.

In this embodiment, however, the flexure rod portion 36 is provided with two necked portions 37 and 38, with the lower necked portion 37 being located below the central flange 31a of the flywheel rotor 31 to define a lower flexure or spring pivot, and with the upper necked portion 38 being located above the central flange 31a of the flywheel rotor 31 to define an upper flexure or spring pivot, whereby the flexure rod portion 36 may flex or bend about both upper and lower pivot locations 38 and 37.

Rigidly fastened at the upper end of the flexure rod portion 36 and above the upper pivot location 38, there is provided a horizontally disposed plate member 39, and a substantially identical flat plate member 40 is rigidly supported by the drive shaft 32 at a location below the lower pivot location 37. Interconnecting the upper and lower plates 39 and 40 are a plurality of tension springs 41, and as best shown in the transverse section of FIGURE 5, four such tension springs 41 may be employed and equally positioned, about 90° apart near the outside diameter of the plates 39 and 40.

As thus far described therefore, there is provided an upper and lower plate member 39 and 40, each being rigidly fastened to the flexure rod and shaft, respectively, at positions above and below the necked pivot locations 38 and 37, and being interconnected by a plurality of tension springs 41. With this arrangement it is observed that a spring tension force is exerted by springs 41 upon the flexure rod portion 36 which continuously seeks to bring the plate members 39 and 40 together or shorten the vertical distance therebetween.

Assuming that the gyro housing does not experience any turning or pivoting action about either coordinate axis perpendicular to its normally vertical axis 42 of FIGURE 4, the gyro rotor 31 and housing are in the aligned positions shown in the figure and no pivoting action takes place about upper and lower flexure pivots 38 and 37. However, upon the housing 30 being rotatively displaced about either such coordinate axis, the spinning flywheel 31 tends to maintain its same orientation in space and the flexure rod 36 bends or pivots upon both necked portions 38 and 37 as best shown in FIGURE 6. In the absence of the tension springs 41 tending to align and pull together the plates 39 and 40, the resilient necked portions 37 and 38 of the flexure rod 36 would normally exert a spring force tending to straighten the flexure rod 36 to its normally unbent position of FIGURE 4 and consequently exert a spring force against the gyro flywheel 31. However, the tension springs 41 oppose the force of the flexure rod 36 and tend to both bring the plates 39 and 40 closer together, as well as tending to retain the plates in their offset position as illustrated in FIGURE 6 as opposed by the forces of the flexure pilots 37, 38, which tend to restore them to their aligned position of FIGURE 4. Consequently by properly designing the tension springs 41 and the flexure rod 36, the opposing spring forces may be made to substantially cancel or balance out one another with the result that no resulting force operates against the gyro rotor 31 and it behaves as a substantially true position gyro.

Thus, by providing two necked portions on the flexure rod 36, one above and the other below the central flange of the rotor 31, and by providing independent means for placing a compressing force on the flexure rod in a direction axially lengthwise thereof, the flexure restoring force of the rod 36 may be balanced, and the flexure rod pivot locations 38 and 37 may serve as substantially true unrestrained pivots as desired.

Although this invention has been described in connection with an exemplary embodiment thereof, it is to be understood that variations in its application and modifications in its construction and arrangement may be made within the broader spirit and scope of the invention as described in the appended claims.

What is claimed is:

1. In a gyroscope having two degrees of freedom, a unitary mass and drive shaft for rotating the mass about an axis, said drive shaft having a unitary flexure means co-axial with the drive shaft for supporting the mass on the shaft and enabling the universal tilting of the mass about said axis, a magnet means supported by the drive shaft and exerting a balanced force upon the mass in the absence of tilting thereof and an unbalanced force thereagainst of increasing magnitude in the direction of any tilting thereof, pickoff means responsive to tilting of the mass about the drive shaft axis for producing a signal proportional thereto, and torque producing means energizable to exert a tilting force upon the mass.

2. In a gyroscope having two degrees of freedom, a unitary mass and drive shaft for rotating the mass about an axis, said drive shaft having a unitary flexure means co-axial with the drive shaft for supporting the mass on the shaft and enabling the universal tilting of the mass about said axis, a permanent magnet means supported by the drive shaft and spaced from the mass, and exerting a force upon the mass, said permanent magnet means being disposed in advance of the flexure means whereby tilting of the mass varies the spacing between the magnet and the mass, pickoff means responsive to tilting of the mass about the drive shaft axis for producing a signal proportional thereto, and torque producing means energizable to exert a tilting force upon the mass, and a sealed and thermally insulating housing enclosing the mass, the drive shaft, the permanent magnet means, pickoff means, and torque producing means.

3. In a gyroscope, a drive shaft and a symmetrical mass, said mass being connected to said drive shaft for rotation therewith by a flexure means, and motor means for driving said drive shaft, a heat insulated enclosure housing said mass and drive shaft, a pickoff means within the enclosure responsive to relative tilting of said mass and drive shaft about said flexure means to produce a signal, and torque generating means within said enclosure and being energizable to relatively tilt said mass and drive shaft, against the restraint of the flexure means, and a permanent magnet means supported for rotation by said drive shaft and normally exerting a balanced force upon said mass and responsive to tilting of the mass to provide an unbalanced force thereon in a direction to increase the tilting of the mass, the flexure means being adapted to restore the mass and the drive shaft to their initial position, after tilting.

References Cited in the file of this patent

UNITED STATES PATENTS

| | | |
|---|---|---|
| 251,865 | Dull | Oct. 10, 1912 |
| 2,704,946 | Gray et al. | Mar. 29, 1955 |
| 2,719,291 | Wing | Sept. 27, 1955 |
| 2,852,943 | Sedgfield | Sept. 23, 1958 |
| 2,919,585 | Schroeder | Jan. 5, 1960 |
| 2,947,178 | Adams | Aug. 2, 1960 |

FOREIGN PATENTS

| | | |
|---|---|---|
| 6,359 | Great Britain | Mar. 1, 1906 |
| 509,447 | France | Aug. 18, 1920 |